Oct. 12, 1965   R. M. PIERSON   3,211,110
ROADWAY STRUCTURES

Filed July 5, 1962   6 Sheets-Sheet 1

INVENTOR.
ROBERT M. PIERSON
BY
ATTORNEY

Oct. 12, 1965 R. M. PIERSON 3,211,110
ROADWAY STRUCTURES
Filed July 5, 1962 6 Sheets-Sheet 3

INVENTOR.
ROBERT M. PIERSON
BY
ATTORNEY

Oct. 12, 1965    R. M. PIERSON    3,211,110
ROADWAY STRUCTURES
Filed July 5, 1962    6 Sheets-Sheet 4
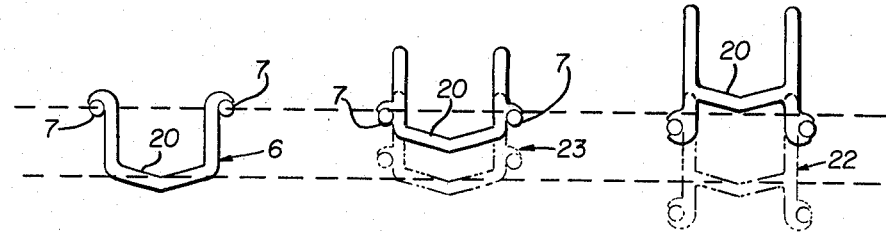
FIG. 10    FIG. 11    FIG. 12
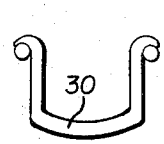    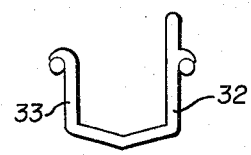    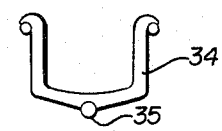
FIG. 13    FIG. 14    FIG. 15
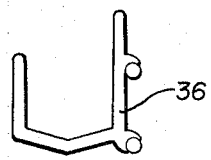        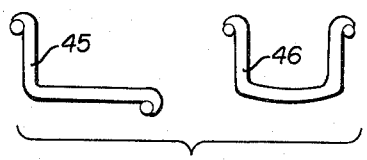
FIG. 16    FIG. 17    FIG. 20
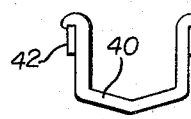    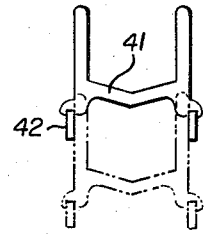    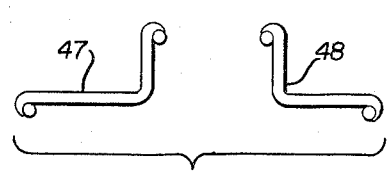
FIG. 18    FIG. 19    FIG. 21
INVENTOR.
ROBERT M. PIERSON
BY
ATTORNEY Oct. 12, 1965    R. M. PIERSON    3,211,110
ROADWAY STRUCTURES Filed July 5, 1962    6 Sheets-Sheet 6

INVENTOR.
ROBERT M. PIERSON
BY
ATTORNEY

# United States Patent Office 3,211,110
Patented Oct. 12, 1965

3,211,110
ROADWAY STRUCTURES
Robert M. Pierson, 233 Aurora St., Hudson, Ohio
Filed July 5, 1962, Ser. No. 207,691
11 Claims. (Cl. 104—123)

This invention relates to elevated roadway structures for standard automotive vehicles, adaptable for making bridges, overpasses, by-passes, overhead roadways, and the like.

The roadway comprises at least one, and preferably a pair of narrow, wheel-bearing channels or wheel tracks affixed to long, highly tensioned, load-bearing members supported at intervals from below (or occasionally from above where spanning rivers, etc.). If a single track is used it is wide enough to accommodate at least one lane of traffic. To compensate for the slight sag of the long, tensioned load-bearing members between consecutive supports, the height of the respective wheel-bearing tracks relative to the load-bearing members varies slightly, being greater in proportion to the distance from a support point. The reason for this will be evident from what follows.

Advantages of roadways of the instant invention over presently known overhead roadways are:

(1) For any selected material of construction, the structure is far lighter in weight for a given load carrying capacity;

(2) Rapidity of erection is far greater, and—because of the relative infrequency of spacing of the ground supports and their comparatively light loads—erection in heavily built-up areas or in rough terrain is greatly simplified;

(3) The construction lends itself to roadways in which the vehicles are directionally guided—i.e. the vehicles do not require steering—and the roadways therefore are readily adaptable to fully automated transportation systems.

The invention is based on the use of highly pre-stressed longitudinal load-bearing members (for example cables) to support the wheel-bearing surfaces, the load-bearing members being so selected as to size and amount of pre-stress that the roadway can remain substantially a straight line even when dynamically loaded, i.e., the mid-span sag is slight enough that vehicles riding on it undergo only minimum up-and-down motion when traversing the sections between supports. By such use of a high pre-tension, plus longitudinal "crowning" of the wheel bearing surfaces in going from support points to mid-span, it is possible to achieve very low overall weight requirements for the roadway tracks plus their supports while maintaining a substantially level riding surface. All of the load-bearing portions of the structure can be, and preferably are, below axle level of the vehicles riding thereon, or more generally below the tops of the wheels. Preferably, though not necessarily, the wheels are borne in separate channels or tracks, and preferably at least one of these tracks is so shaped in cross-section as to cause any of a wide range of wheel sizes to ride down the center, obviating the need for steering. Instead of channels, L-shaped tracks may be used.

The supports are preferably arched or triangular members whose "legs" are approximately parallel to the roadway and whose function is primarily to transmit to the ground the vertical weight loads and the horizontal components of the dynamic loads (i.e. over and above the pre-tension load), though not any substantial fraction of the horizontal component of the static (pre-tension) load, which latter is generally much larger than the dynamic loads. Means are provided to stabilize the channels as much as possible with respect to dimensional and angular changes under loads imposed by wind and by passing vehicles, so as to provide riding characteristics within the vehicle which are substantially free of roll, pitch, yaw, jounce, and tilt. In spanning rivers and the like, overhead supports may be used.

Although the basic concept of the invention is not limited as to material used nor the cross-sectional shape or structure of the horizontal, longitudinal tension-bearing members used to absorb most of the load, the material usually best suited from the standpoint of high modulus and low cost is steel. Use of steel in the form of cable (wire rope) will usually be preferred on the basis of convenience and speed of erection; however, the lower cost of other forms of steel may in many design situations favor some form other than cable.

Although the present invention is not concerned with the means for absorbing the very high horizontal components of stress required for applying pre-tension, it is evident that any of the more commonly used techniques can be used, such as imbedded anchorages. Generally, economic considerations will favor the use of as few stress-bearing anchorages as feasible—i.e. at turns, terminals, access and egress points—so that the ground supports will bear only the vertical weight loads plus relatively small horizontal components of the dynamic loads.

Design of turns and access and egress points are not dealt with herein.

Illustrative embodiments of the invention are shown in connection with the accompanying drawings, in which—

Figure 6:
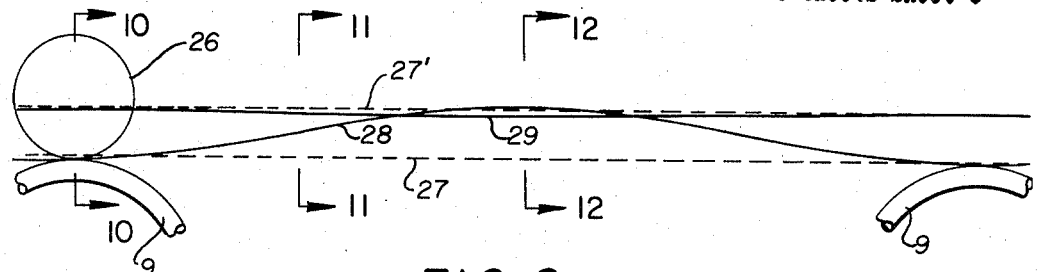
FIGURES 6, 7 and 8 are comparative diagrammatic views in elevation which show the advantages of longitudinal crowning.
Figure 22:
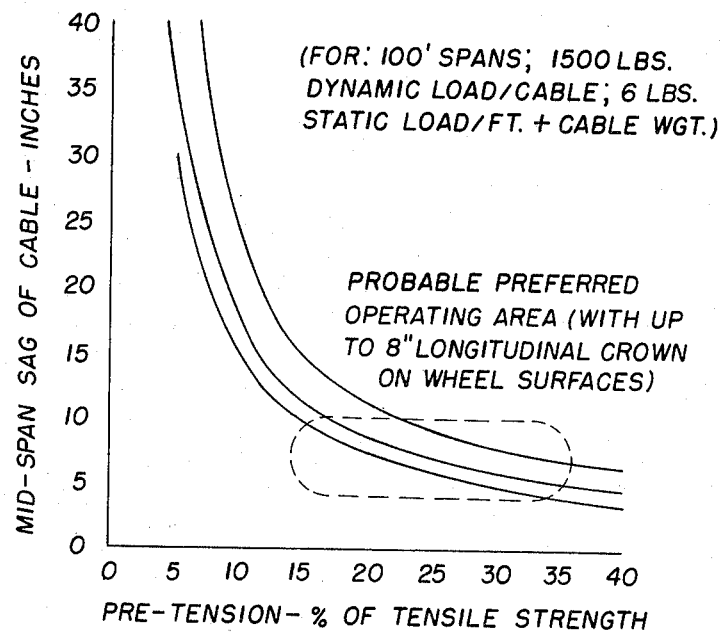
Figure 23:
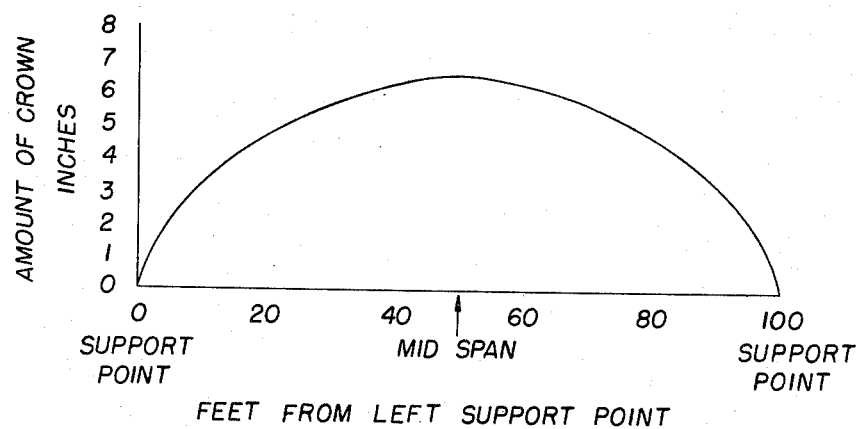
Figure 24:
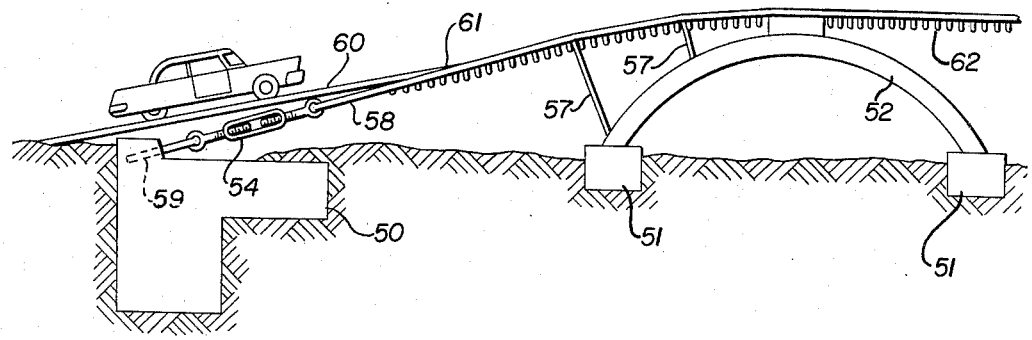
Figure 25:
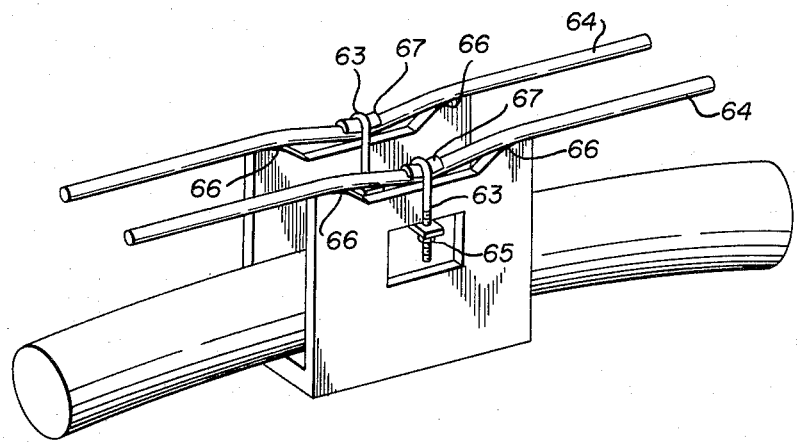

FIGURES 10, 11 and 12 are cross sections on the lines 10—10, 11—11 and 12—12, respectively, of FIGURE 6 showing the relation of a channel element and two load-bearing members at different distances from a ground support; FIGURES 11 and 12 each showing the relation of unloaded (full lines) and loaded (dot-dash lines) positions;

FIGURES 13 to 17 are elevations of different designs of channel elements and associated load-bearing members;

FIGURES 18 and 19 are elevations of different designs of channel elements and a different type of load-bearing members, FIGURE 19 showing the relation of unloaded (full lines) and loaded (dot-dash lines) positions;

FIGURE 20 shows an L-shaped member and channel instead of two channels;

FIGURE 21 shows a pair of L-shaped elements that might be used with the uprights at the inside of the two wheel paths, and the load-bearing members;

FIGURE 22 shows graphs of the effect of the pre-tension versus mid-span sag;

FIGURE 23 is a graph showing the relation of the crown of the load-bearing members to the distance from a support;

FIGURE 24 is an elevational view of a main anchorage at one terminal of a roadway, and the first ground support arch; and FIGURE 25 is a perspective view of an attachment assembly showing the connection of horizontal load-bearing tension members to the ground supports, and a means of adjusting tension to compensate for temperature changes.

Figure 1:
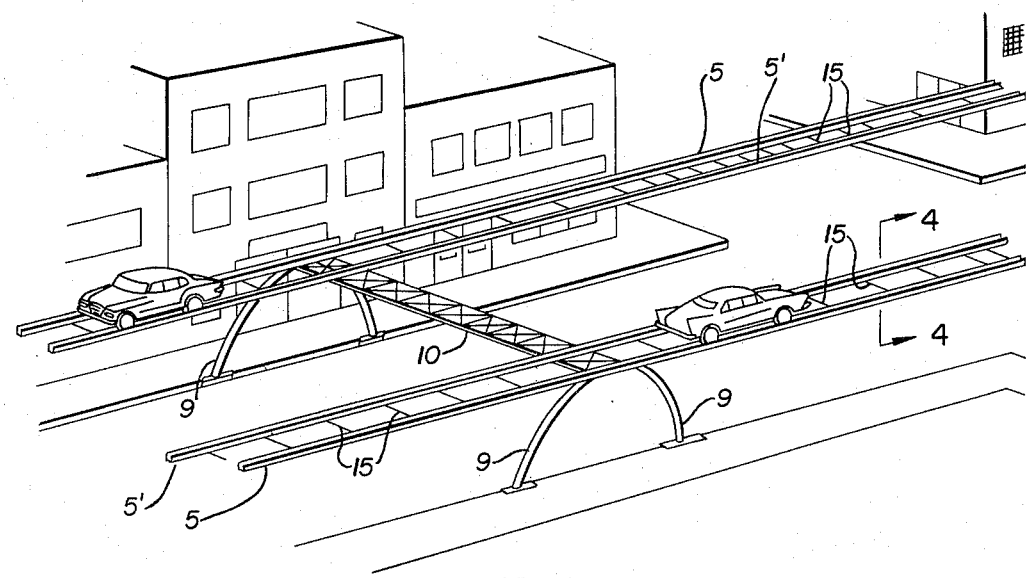
FIGURE 1 is a general view in perspective of a section of an overhead roadway on a city street.
Figure 2:
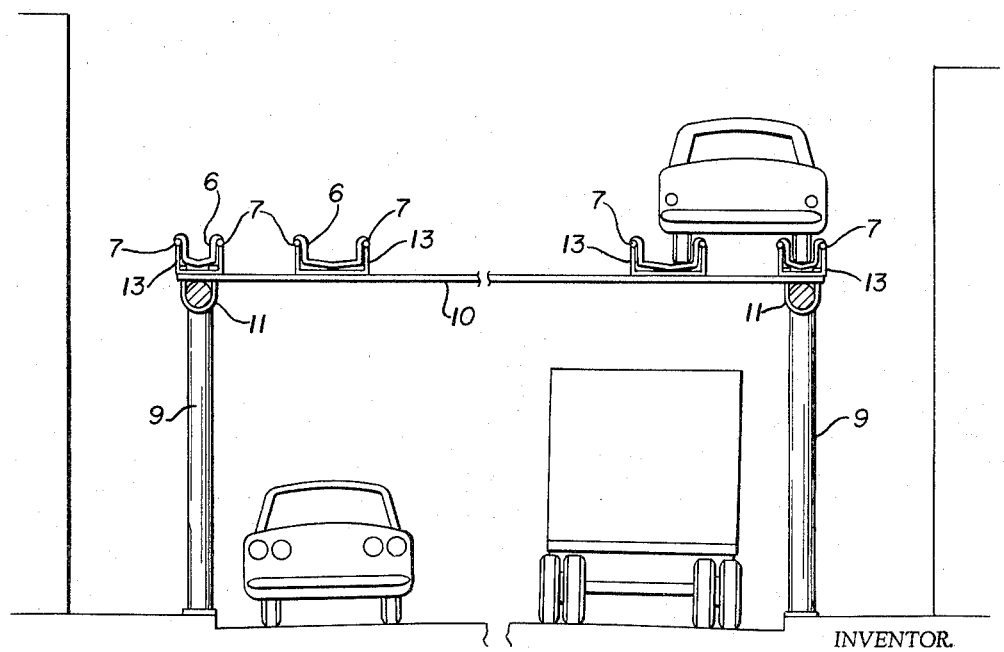
FIGURE 2 is a vertical section across such a roadway.
Figure 9:
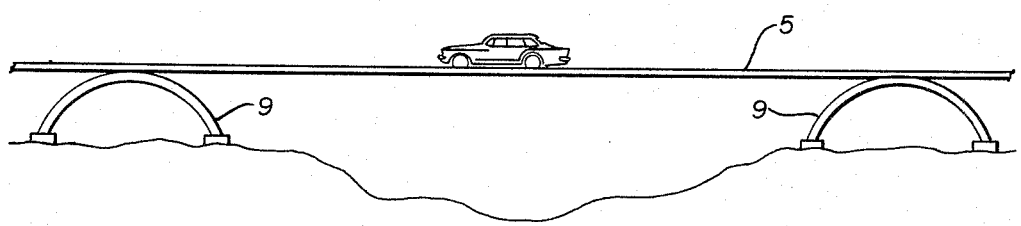
FIGURE 9 shows the overhead roadway spanning a ravine.

The roadway may be elevated over a city street, as illustrated in FIGURES 1 and 2, or over rough cross-country terrain, or suspended over a river or chasm as illustrated in FIGURE 9. Further, it may substitute for a bridge between two sections of roadway of more usual construction.

Figure 3:
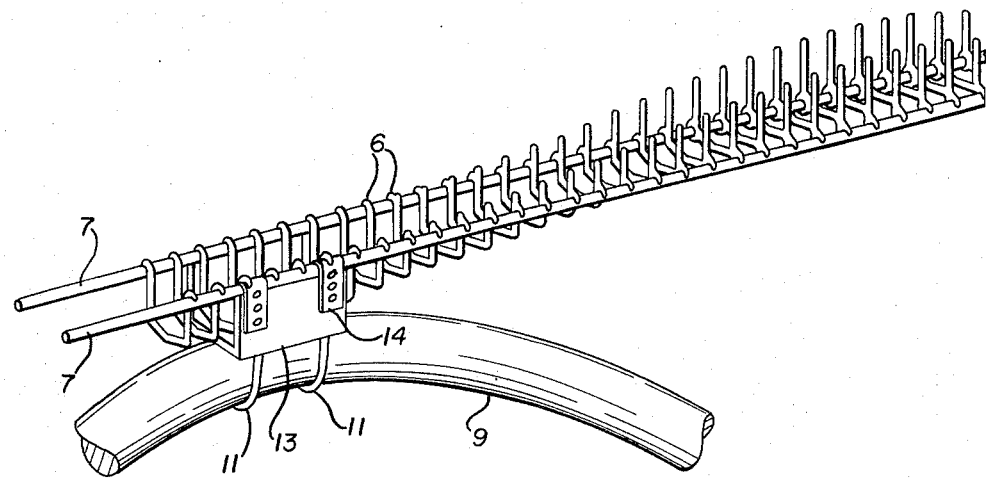
FIGURE 3 is a detail showing the relation of a support and a preferred channel construction.
Figure 5:
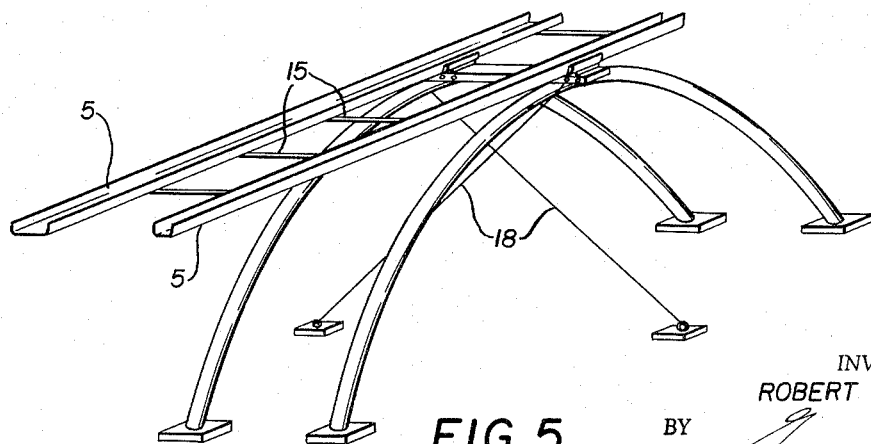
FIGURE 5 is a perspective view of a 2-channel lane and associated ground support.

In FIGURES 1 and 2, two-lane structures for traffic in both directions are shown. It is understood that there may be one or more lanes, but that each lane is limited to one-way traffic. In FIGURES 1, 5 and 9 the channels or track 5 and 5' are shown as continuous, although actually they are built up of many closely spaced, flat plates 6 perpendicular to the supporting pre-tensioned cables 7 and supported thereon at notches, as illustrated in FIGURE 3. Preferably one track is wider than the other (FIGURE 2) so that vehicles with wheels spaced different distances acn be carried over the same tracks. Each track may be a channel; one channel may be used with one perfectly flat track or an L-shaped track, or both tracks may be L-shaped with the two uprights on either the inside or the outside of the track. Although usually not preferred because of the increased weight, the roadway may be a single wide track somewhat wider than the maximum wheel separation of the vehicles to be carried. The support of the metal plates by the cables is described in detail below. These plates are preferably each about $\frac{1}{16}$ to $\frac{1}{4}$ inch thick, and in no case more than $\frac{1}{2}$ inch thick, with a space of 1 to 5 inches between each two plates. Auxiliary means will be necessary in most cases for rigidly fixing the longitudinal spacing between plates, but are not dealt with in this specification.

At each of the arches 9 is a stabilizing cross member 10 anchored to the arch by U-bolts 11. These members 10 serve both to prevent the channels from making rotational movements about their longitudinal axes and to minimize side sway of the entire structure. Attachment assemblies 13 (of the same or different widths) which support the cables 7 by attachment collars 14 are fastened to the cross members 10.

FIGURE 9 shows the same roadway spanning a ravine.

In FIGURE 1, the inner channel of each lane is shown as not directly affixed to a ground support 9. Therefore, it is rigidly affixed to the cross member 10 in order that the latter can absorb both the vertical and the horizontal components of the dynamic load imposed upon them. However, over open country, where there would be less limitation on the number of ground supports 9, it would usually be preferable to have both channels of each lane connected directly to a ground support.

The channel plates 6 are welded or otherwise fastened to the cables. The are separated sufficiently to permit snow, rain and wind up to pass between them freely. The flat planar members 6 in FIGURE 3 are so shaped in the lower, or wheel-bearing portion and are narrow enough that they cause tires to track down their center. It is only necessary that one channel be of this construction, and the other channel of each pair is preferably much wider and flatter in order to accommodate a range of wheel separations. (See FIGURES 2 and 4.) In fact, neither wheel-bearing surface need be channel shaped because a total of only one inner and one outer guide will keep a vehicle on the track if the lateral spacing between vertical guide segments is close enough to the wheel spacing so that yawing movements cannot occur.

Figure 4:
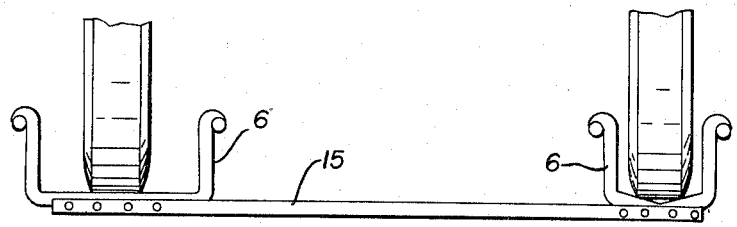
FIGURE 4 is a cross-sectional detail on line 4—4 of FIGURE 1.

FIGURES 1, 4 and 5 show stabilizing bars 15 between elements 6 of the two different channels, at quite frequent intervals (particularly near mid-span) in order to prevent the channels from making rotational movements about their longitudinal axes. FIGURE 5 shows cross-bracing cables 18 which prevent lateral swaying.

FIGURES 10 to 12 show a single basic channel shape, with the individual flat planar members comprising the channel suitably modified according to their positions along the horizontal load-bearing member, particularly with reference to the height of attachment to the latter. Adjacent channel elements 6 are attached to the cables 7 at slightly different heights relative to their wheel-bearing surfaces 20, but usually several of identical construction will be grouped consecutively, preceded and followed by groups of slightly different construction. The element 6 of FIGURE 10 is used adjacent the arch support 9, the element 22 of FIGURE 12 is used mid-way between two supports and the element 23 of FIGURE 11 is used between the other two, as clearly indicated in FIGURE 6. In channel 6 of FIGURE 10 the cables 7 are at the tops of the sides, in channel 23 they are only a little above the load-bearing surface 20, and in channel 22 they are below the load-bearing surface 20. The cables progressively further from the supports are slightly lower on the channels as indicated by the reference lines through FIGURES 10–12 to compensate for the slight sag in the cables under static load.

Figure 7:
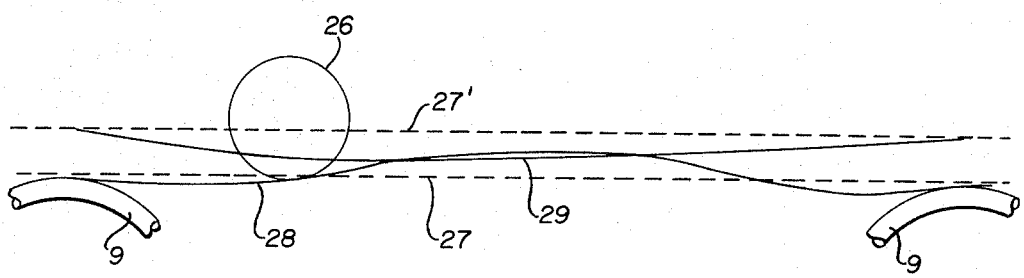
Figure 8:
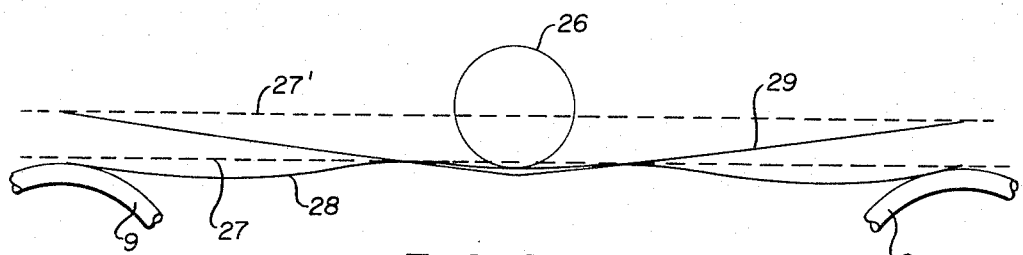

In FIGURES 6, 7 and 8 exact size relationships between the various dimensions have not been observed. The wheel 26 is large relative to the horizontal dimension between supports 9, and it is supposed that the weight of the vehicle load is centered at the center of the wheel. The distance between the supports 9 is inordinately short, the scale of the vertical dimension being many times that of the horizontal dimension. The dotted lines 27 and 27' are parallel horizontal reference lines through, respectively, they wheel-bearing surface 20 (FIGURES 10–12) of the channels and the horizontal tension member 29 at consecutive ground support points. The line 28 represents the wheel-bearing surface, and line 29 represents the cables or other load-bearing members. These load-bearing members are individually crowned between the ground supports to provide nodes separated by antinodes. As the wheel 26 moves from above one support 9 toward the next support, the wheel-bearing surface 28 whose longitudinal crowning causes it to rise well above reference line 27 between the supports when not loaded, tends to flatten out under load, and this is progressive as the wheel advances. At the same time the cable sags more and more until the wheel passes the mid-span point, after which it sags progressively less. As clearly illustrated in FIGURES 6 to 8 the longitudinal crown is calculated to be substantially equal to (or only slightly more than) the sag, thus offsetting the sag. Thus, under dynamic loads, the cable sag at mid-span is substantially below reference line 27, whereas the wheel-bearing surface 28 at no point where dynamic load is concentrated departs significantly from reference line 27'. However, in order to keep cable sizes as small as possible and/or spacing between supports as great as possible, it is desirable from an economic standpoint for wheel-bearing surface 28 to be depressed as much below reference line 27' as is permissible by riding qualities within the vehicle. Generally the maximum depression of 28 below 27 will be less than 4 inches for spaces up to 100 feet. For very long spans, substantially greater sag would be tolerable. If the distance between supports is 100 feet, the crown of the unloaded load-bearing surface and the sag of the loaded cables may together be of the order of one or two feet. For longer spans, the sag can be correspondingly greater.

The crown is formed by attaching the cables at different heights on the sides of the channels with respect to the wheel-bearing surface, as discussed in connection with FIGURES 10–12.

FIGURES 13 to 19 illustrate different channel configurations. In the channel 30 of FIGURE 13 there is not the pronounced V-shape in the road-bearing surface 30, found in the channels 6, 22 and 23. Due to slightly different separations between front wheels and rear wheels on some cars (usually less than 1½ inches), a design of the channel bottom will have to be selected which will cause the vehicle to "track" without yawing, even though neither the front nor the rear wheel is exactly centered in the guide channel.

In FIGURE 14, the outer retaining member 32 of the channel is taller than the inner retaining member 33. The latter is positioned under the vehicle, and its maximum height is limited to five to seven inches by the necessity of avoiding the lowermost structures on the undersides of cars traversing the roadway.

Three cables are used to support the channel 34 of FIGURE 15, the central cable 35 being the main cable.

In FIGURE 16, both cables are on one side of the channel and fastened to vertical member 36 which is located out from under the vehicle.

The channel 37 of FIGURE 17 has the channel wider just below the point of attachment to the cables, to minimize tire sidewall contact with channel walls and to prevent tendencies of tires to "ride" out of the channels. This widening below the top of the channel opening may also be applied to the constructions of FIGURES 13 to 16.

In each of the types of channels shown in FIGURES 13 to 17, consecutive groups of channel-forming members will be used in which the load-bearing cables support the channel-forming members at different heights from the wheel-bearing surface, similar to the method employed in FIGURES 10–12.

FIGURES 18 and 19 show channels 40 and 41 associated with bar stock 42 of rectangular cross section used as the load-bearing members rather than cables. In FIGURE 19, the position of an unloaded channel 41 located away from the ground support is shown in full lines and its position under load is shown in dot-dash lines. Tubing, rods, I-beams, angles, channels, and other common forms of a long, high-strength metal stock may be used in place of bar stock.

FIGURE 20 shows an L-shaped element 45 used with a channel 46, instead of two channels. The channel 46 keeps the wheels on one side of the vehicle in line so there is no need for even one wall on the L-shaped element. It might be perfectly flat.

FIGURE 21 shows two L-shaped elements 47 and 48 with the wall of each on the inside. It might equally well be located on the outside. Means will be provided for attaching cables to each of these modifications shown in FIGURES 13 and 21 at different heights with respect to the height of its wheel-bearing surface.

IMPORTANCE OF HIGH PRE-TENSION

To underline the necessity of applying a high pre-tension to the cables or other stress-bearing tension members used for supporting the channels in order to achieve both an acceptably low sag and an economically feasible size, as well as a practical degree of separation between cable supports, comparisons are made in Table 1 between the following structural arrangements of a single lane, 2-channel roadway, each channel being supported by two cables, the distance between cable supports being 100 feet.

CASE 1.—Highly pre-tensioned cable, pre-tensioned to approximately 30 percent of its ultimate tensile strength (including static load), and having the smallest diameter consistent with an acceptable safety factor, a mid-span deflection (sag) which is within the range which can be tolerated from a ride-comfort standpoint, and a practical degree of separation between ground supports.

CASE 2.—Same size cable and separation between ground supports as in Case 1, but with the pre-tension (including static load) of only 7 percent of ultimate strength. This situation produces an unacceptably large sag from a ride-comfort standpoint.

CASE 3.—Larger cables than Cases 1 and 2, same spacing between supports, cables pre-tensioned to same percentage of ultimate strength as in Case 2 (7 percent), and with cable size selected to give about the same mid-span sag as Case 1. This situation gives a more nearly acceptable ride, but is economically far less attractive than Case 1.

Table 1

| | Case 1—Cable pre-tensioned to 30% of tensile strength | Case 2—Conditions similar to Case 1, except only 7% pre-tension | Case 3—Larger cables, 7% pre-tensioned to give same sag as Case 1 |
|---|---|---|---|
| Diam. of cable, inches [1] | 1.5 | 1.5 | 3.5 |
| Cable weight/foot, lbs | 4.7 | 4.7 | 25.5 |
| Total weight/foot/cable, lbs.[2] | 10.7 | 10.7 | 31.5 |
| Mid-span sag* under static load only, inches [3] | 2.0 | 8.3 | 4.5 |
| Mid-span sag* with dynamic load of 1500 lbs., inches [4] | 6.8 | 23 | 8.7 |

[1] All calculations based on use of galvanized bridge strand, having ultimate tensile strength of ca. 200,000 p.s.i.
[2] Channel assumed to weigh 12 lbs. per foot of channel length, equivalent to 6.0 lbs. per foot of cable length.
[3] Calculated from: $y = ws^2/8t$, where $y$=mid-span sag (feet); $w$=weight per foot of cable plus channel; $s$=span, feet (=100 feet); $t$=static loaded horizontal tension in cable, lbs. (82,000 lbs. for Case 1; 19,300 lbs. for Case 2; 77,300 lbs. for Case 3).
[4] Calculated from $y = Gs/4t + ws^2/8t$, where $G$=weight of concentrated load, lbs. (=1500) and the other letters have the same meaning as in note 3. $t$ for Case 1=95,000 lbs. under dynamic load; for Case 2, 31,000 lbs., and for Case 3, 105,000 lbs.

*Sag is for cable only, not for the wheel-bearing surface of the channel; the latter will ordinarily be "crowned" in the lengthwise direction, as dealt with in detail below.

It is clear from a comparison of the figures in Table 1 that pre-tensioning of the minimum size cable consistent with safety, as in Case 1, gives an acceptably small sag from a ride-comfort standpoint, whereas (a) in Case 2, which is approximately equivalent to Case 1 in cost (i.e., same cable size), there is far too much sag under load for satisfactory ride qualities; and (b) in Case 3, which has a more nearly acceptable degree of sag, there is approximately 5½ times as much cable required as in Case 1, making the economics very unfavorable for the use of heavy cables at low percentage pre-tension loads.

As an indication of the tremendous economies possible with the instant invention, a 2-lane roadway based on the consrtuction of Case 1, weighing 45 to 50 lbs. per lineal foot, would weigh of the order of 2 percent or less of a conventional 24-foot wide 2-lane concrete-and-steel overhead roadway of similar weight and traffic capacity. Further, erection would require only a minute fraction of the time required for conventional construction.

Other considerations being equal, it will almost invariably prove preferable to select the size of cable which, when pre-tensioned and dynamically loaded to the maximum value permitted by safety limitations, will result in the maximum mid-span sag (under load) that permits an acceptable riding quality in the vehicle. Generally, in order to accomplish this, the horizontal pre-tension load (including the static load imposed by the weight of the channels) will preferably be large in comparson to the additional load imposed by passing vehicles, and in comparison to side loads imposed by high winds. To illustrate these points further, FIGURE 22 is submitted which is a graph of mid-span sag under static plus dynamic load versus pre-tension load (as a percent of ultimate tensile strength), showing a family of curves for several cable sizes. The ordinate scale shown indicates only the sag of the tension member itself rather than the net sag experienced by the wheels of a passing vehicle, which latter can be as much as 8 inches less than the former as a result of lengthwise crowning applied to the wheel-bearing surface of the channel. (The beneficial effects on economics and ride qualities are recounted more fully in the next section.) As in Table 1, all calculations are based on the use of galvanized bridge strand of approximately 200,000 lbs. per square inch tensile strength, with each cable supporting a design dynamic load of 1500 lbs. and being supported at 100-foot intervals by ground supports. The area within the dotted oval in which the pre-tension load is 15 to 35 percent of the ultimate tensile strength, and on occasion may be as much as 40 percent, is believed to represent the region wherein optimum compromises between costs (of which cable will be a major portion) and acceptable ride qualities will generally lie. Values significantly higher than 30 percent are generally not permissible because of the necessity of maintaining safety factors of three or more, and values substantially less than 15 percent imply the use of excessively large cable sizes and/or degrees of sag. The figures for Table 1 and FIGURE 22 are based on a selected condition of loading and vehicle density (spacing) which, obviously, may differ considerably in an actual installation from that shown. For example, designing to accommodate a number of vehicles per 100-foot span may be incorporated in some cases for safety purposes, although it will usually be preferable to provide means (warning devices, etc.) which assure no more than, say, two vehicles per 100-foot span.

It is evident from the foregoing that, in order to combine acceptable ride qualities with acceptably low costs, pre-tensioning to a degree sufficient to limit the sag of the horizontal tension member under its dynamic load to much lower values than are commonly used is essential. Generally, the sag under dynamic load will be less than 1 percent of the span, and—in order to fall within the objectives of this invention—invariably less than 1.5 or 2 percent.

Further, it will usually be more economical to design installations wherein the ratio of static load (including pre-tension) to the increment load caused by the moving load is considerably higher than is usual practice for spans under 200 feet.

CHANNELS AND OTHER WHEEL-BEARING SURFACES

The channels or other wheel-bearing surfaces in or on which the tires ride may be made of any of a variety of constructions, for example, (1) continuous solid surface, such as may be formed by extrusion or cold rolling ordinary channel; (2) channel similar to foregoing, except with perforations, transverse slots, or other openings cut in the bottom, so as to improve traction and water drainage; (3) grating; (4) series of closely spaced planar members transverse to the channel axis, shaped in cross section to accommodate the wheels and to engage the tensioned longitudinal load-bearing members. It is believed the last-named construction will be preferred in many situations, primarily because of low weight and minimum lateral wind resistance. In addition to the requirement of being securely fixed to the horizontal load-bearing members, the planar wheel-supporting members would presumably be rigidly positioned with respect to their lengthwise spacing, and usually with the maximum spacing permitted by such considerations as load per planar member and the transverse crease-like distortion caused on the tire. Spacings less than about one inch would be undesirable in northerly climes from the standpoint of snow accumulation and clogging in the openings; and openings greater than about five inches are generally undesirable for the aforementioned reasons of excessive local load and tire deformation.

EFFECT OF CROWNING

An avenue for decreasing the size of cable or other tension member and/or the frequency of spacing of ground supports necessary to avoid exceeding some selected maximum mid-span sag under load, as well as to maintain a substantially level ride, is to "crown" the wheel-bearing bottom surfaces in the lengthwise direction. Thus, when not loaded with a passing vehicle, the bottom of the channel is appreciably above a straight line between channel bottoms as support points. By proper selection of the amount of crowning as a function of distnce from support points—i.e. so as to be approximately equal to the amount of cable sag at the point in question—a substantially level ride can be achieved even though the tension member sags appreciably. Thus, in FIGURE 6, the wheel-bearing surface 28 between the supports 9 is appreciably above the surface at the supports when unloaded, but more nearly approaches a horizontal line when under dynamic load, as in FIGURES 7 and 8. In general, the height of the wheel-bearing surface at the mid-point of a span, i.e. the maximum crown height, is above a straight-line surface by as much as ¼ to 1½ or 2 percent of the length of the span. By use of such crowning, the actual dip felt in the vehicle can be rendered virtually unnoticeable.

An additional advantage of applying carefully chosen degrees of crowning at various points along the channel is that the peak effect at the support points (producing a rather sharp jounce, if not compensated for) can be greatly minimized. This is shown in FIGURES 6 to 8, particularly FIGURE 7. It is also illustrated in FIGURE 23 which is a graph of the amount of longitudinal crowning (which is preferably non-linear as shown) as a function of the distance from a support point. As shown, it takes a relatively sharp rise (raising the wheel-bearing surface relative to the cables or other tension members) just before and after each support point.

In order to minimize further any perceptible peak effects experienced on passing the support points, and not to rely wholly on precise control of the amount of crown near the support points, it may be preferable in many cases to install cantilevered bars or leaf springs extending for distances up to a foot or two on each side of each support point, under the tension members. Thus, a more gradual shifting of load from support point to tension member is achieved.

In a high proportion of situations, use of longitudinal crowning will markedly lower overall costs. For elevated roadways of any appreciable length, it will be preferable in most cases to space the ground supports as far apart as practical, where the maximum permissible separation will usually be arrived at by balancing ride qualities against the costs of heavier cable necessary to maintain a mid-span sag no greater than some preselected maximum. Generally speaking, the maximum amount of crown which it is practical to use will be determined by the vertical dimension of the walls of the channel, the inner of which may be shorter than the outer as illustrated in FIGURES 14 and 16; or the inner legs may be omitted entirely as by transposing the L-shaped members illustrated in FIGURE 21 to avoid all such difficulty. The top-most and lower-most points of the inner leg (where an inner leg is used) would normally represent the limits within which attachment of the channel to the tension members would be made. If this range were, say, 10 inches, the latter figure would fix the maximum utilizable crown which could be applied. Since a moderate amount of vertical movement of the wheels—perhaps of the order of two or three inches for a 100-foot spacing between supports—is tolerable from a ride standpoint, this amount can be added to the crown to obtain the total permissible sag of the tension member. Applying this total of, say, 12 inches to Case 1 of Table 1 calculated earlier, that of two 1½-inch cables supporting each channel, and each cable pre-tensioned by 82,000 lbs. and carrying a design static load of 10.7 lbs. per foot (including cables) and a moving load of 1500 lbs., it can be shown by calculation from the formula in footnote 4 of Table 1 that the support points can be as far apart as 150 feet by use of 10 inches of crown plus two inches of vertical movement of the vehicle's wheels; whereas if no crown were used, a maximum spacing of only 33 feet would be necessary to keep the vertical bounce within two inches.

In designing roadways of considerable length which must accommodate a range of vehicle weights, it will usually be preferable to use an amount of crown which gives a virtually level ride for the most common weight of vehicle. Vehicles heavier than this average weight will experience a jounce (in proportion to the amount by which they exceed the design load) caused by the bottoms of their wheels at mid-span dipping below the imaginary straight line between channel bottoms at consecutive support points, whereas vehicles lighter than the design load will experience a bounce caused by their wheels rising above this imaginary line at midspan.

WIND LOADS

A principal advantage resulting from use of high pretension on the channel-supporting members, over and above the relatively light and small structures which it makes possible, is that auxiliary means applied to the channels for absorbing side loads caused by high cross winds will, in most cases, be unnecessary. For example, if the side area per lineal foot of channel were of the order of 0.3 square foot for closely spaced planar members presenting only their edges to the cross-winds, a sideways static load of approximately 15 lbs. per lineal foot of channel would be imposed by a hurricane-force cross-wind exerting a flat plate force equivalent to 50 lbs. per square foot. Since the net force of 7 to 8 lbs. per foot of each tension member would thus be less than its normal static load, it is evident that pre-tensioning is in itself adequate, in most cases, to handle side loads from the wind without auxiliary apparatus for this purpose disposed along the elevated roadway. Side bracing at the ground supports, as shown in FIGURE 5, would normally be used to decrease the size and rigidity of the imbedments of the ground supports.

ANTI-ROLL STABILIZER

In order to minimize tendencies for the channels to undergo incipient rolling about their long axes—causing the wheels to ride on the low side and producing an unpleasant ride sensation in the vehicle—it will ordinarily prove desirable to provide rigid cross members, such as members 15, rigidly attached transversely to both channels at infrequent intervals, of from 2 to 25 percent of the span length. As shown in FIGURE 4, such stabilizing cross members maintain the tensioned cables in fixed vertical relationship to each other, and thus effectively counteract any tendency of either channel to undergo rotational movements about its long axis, even though the dynamic loading may differ substantially between the two cables supporting the channel. The cross members would preferably be more frequently spaced near the middle of the spans than at support points, as shown in FIGURE 1.

MEANS FOR MAINTAINING CONSTANT SEPARATION OF TENSION MEMBERS

The economic incentive to use as light a channel-forming material as possible will, in some cases, result in channels wherein the weight of the dynamic load causes the two tensioned members supporting an individual channel to narrow or move inwardly toward each other, to a degree which may interfere with the easy passage of the tire. A means of offsetting the tendency of the channel to "narrow" at the plane of the supporting tension members is to incorporate heavy sections integral with or surrounding and affixed to the channels which are rigid enough in concert to oppose the inwardly pushing force of the tension members. For example, a vehicle which at mid-span caused a horizontal force of 500 lbs. to be exerted (through the channel-forming members) on each of the tension members, opposing each other, a "spring constant" of the channel itself of four pounds per inch per each lineal foot of channel (measured horizontally between the tension members) would have to be developed by the channel itself. Rigidizing members spaced at intervals of two to ten feet along the channels and connected to the tension members may be necessary in many installations to provide the desired constancy of channel opening under load.

ANTI-YAWING DEVICES

In order to minimize yawing tendencies at high vehicle speeds and in high cross winds, it will in many designs be preferable not to rely solely on the "groove effect" of the guide channel acting on the tires, but to incorporate means for more forcefully causing the vehicle to follow a straight line course down the centerline of the guide channel. One such arrangement might incorporate a spring-loaded pulley wheel mounted just inwardly and to the rear of the vehicle's front wheels, which is caused to ride over the top of the inner leg of the channel. In order to achieve a high degree rigidity with respect to lateral movement of the car, the pulley arm is preferably mounted on the car's frame.

AVOIDANCE OF VIBRATIONS IN CHANNELS

As a means of minimizing or preventing up-and-down vibration by channels due to alterations of loading on channels caused by swaying vehicles, or other causes, auxiliary stabilizing cables connecting intermediate points alongs the horizontal load-bearing tension members either to the ground below or diagonally with the bases of the ground supports may be added. Preferably, these stabilizing members would be tensioned so that the vertical component of tension is at least 20 percent of the dynamic load, with the result that considerable additional tension would develop in the stabilizing member as the point of attachment to the horizontal load-bearing member rises significantly above the position it occupies when no moving load is passing. Some change in the curvature of crowning (in the longitudinal direction) of the wheel-bearing surfaces—FIGURES 6, 7, 8 and 23—would be made in many instances in order to preserve as level a ride as possible.

TENSION MEMBERS OTHER THAN CABLES

Although, due to its ease of erection, cable, or wire rope, will be the preferred material for carrying the high pretension stresses necessary for supporting a stable roadway in a high proportion of structural situations, its high per pound cost relative to other forms of steel— such as rods, bars, angles, T's, I-beams, etc.—may in certain situations make one of the latter forms preferred from a cost standpoint. FIGURES 18 and 19 are cross-sectional views of a channel wherein bar stock 42 is the longitudinal strength-bearing member instead of cable. Under the same dynamic load (1500 lbs. per tension member) and with the same spacing between ground supports (100 feet) as used for obtaining the calculations of Table 1 and subsequent FIGURE 22, it can be shown that a high grade of steel bar stock of 90,000 lbs. per sq. in. tensile strength, measuring 1" x 3" in cross section and prestressed (including static load) to 25 percent of its strength—i.e. 67,500 lbs. total—will exhibit an approximate sag at mid-span of 8.7", under dynamic load, when calculated from $$y \text{ (in feet)} = \frac{Gs}{4t} + \frac{ws^2}{8t}$$

(G=dynamic load, 1500 lbs.; s=span, 100 feet; t=tension, lbs.; w=19.0 lbs., weight of static load per foot, including 6 lbs. per foot of channel-forming member.)

APPLICATION ABOVE EXISTING ROADWAYS

For certain installations in heavily populated areas where minimum interference of ground-support structures with roadways, buildings, etc. already present could have an important bearing on decisions on whether the elevated structure of the instant invention would be adopted in preference to some alternative method of increasing traffic handling capacity, it will prove expeditious to carry the lanes directly over the lanes of roads on the ground, and to use ground supports offering little or no obstruction to existing roadways. FIGURE 1 is a perspective of two lanes of overhead roadway positioned over the two outer lanes of a four-lane main thoroughfare in a commercial section of a city. Vertical supports 9 are located only at the curbs in order to minimize obstruction on the street or sidewalk below. Cross members 10 having exceptionally high rigidity in a horizontal plane are essential in such situations in order to absorb the longitudinal loads imposed by the moving vehicles on the tension members of the inner channels 5'. The latter are not directly supported by ground supports, though their tension members are pre-tensioned to at least as high a level as those of the outer channels by heavy tension-absorbing means (not shown) common to each of the tension members.

FIGURE 2 is a cross section of the same two-lane overhead roadway, showing the placement of the supports in relation to the curbs, and indicating how all four lanes of the street beneath can remain unobstructed, as well as the adjoining sidewalks. Entrances and exits to the overhead lanes would presumably be confined to the outside lanes of the ground-level road, keeping the inner lanes open to through traffic.

METHOD OF ERECTION

In most overhead roadways of appreciable length involving a number of ground supports, cost considerations will favor designing the ground supports to absorb only the vertical (weight) loads and the horizontal component of the moving loads, and not the much heavier horizontal pre-tension loads, which latter will ordinarily be borne by heavy anchorages or piles at turns or terminals. An important requisite for attaining the cost savings resulting from not having the ground supports bear any significant part of the pre-tension load is a method of erection wherein the latter loads are not imparted to the ground supports to any significant degree at any time during erection, as well as not during use. A preferred method for achieving use of relatively lightweight ground supports is to apply substantially all of the pre-tension load to each entire length of the tension members, previously positioned in place, prior to their being attached to the ground support structures. Thus, the additional stretch imposed by the static load is made before the tension member is rigidly affixed to the ground support, and there is no net horizontal force borne by the latter as a result of the pre-stressing operation.

Since individual tension members may be thousands of feet, or even miles, in length between points where the high pre-tension loads are borne to the ground—especially if sections each representing a reel of cable are end-linked together—there may be situations where many dozens of ground supports are attached (after tensioning) to a single length of horizontal tension member. However, vertical support would preferably be supplied by the ground supports during the tensioning operation.

Alternatively, or in supplementation of the foregoing method, the pre-tension load can be applied more or less simultaneously to each section between ground supports, so that the net horizontal force on the latter remains at small levels (relative to full pre-tension force) while tension is being increased to the designed pre-tension level.

Use of either of the two foregoing methods will allow use of ground supports whose horizontal load-bearing capacities are relatively low and which are correspondingly low in cost and simple to erect. FIGURE 24, for example, shows schematically, the relative size of a terminal ground anchorage 50 which must absorb the very heavy pre-tension load of ca. 184,000 lbs. imposed by the pair of cables 58 comprising a channel in Case 1 of Table 1, and the much smaller anchorage 51 at each end of an arch of a ground support 52, which latter are required to absorb only the *increment* horizontal load of ca. 26,000 lbs. (=2×(95,000–82,000)) per pair of cables imposed when the dynamic load of 1500 lbs./cable passes. Thus, the anchorages for the ground supports are preferably sized to absorb less than 20 percent of the horizontal load borne by the terminal cable anchorages. The pre-tension can be adjusted by turnbuckle 54. In order to simplify construction in the region near the ground anchorage 50, vehicles are preferably carried over the imbedment point 59 and the turnbuckle 54 on a rigid, non-tensioned transition section 60, suitably channeled at attachment point 61 for vehicles to ride into the wheel-bearing channels 62 with minimum bounce. The bracing members 57 are under compression to make the change in angle more gradual in going over the first ground support.

As a means of increasing safety factors without having to resort to unduly heavy tension members, terminal anchorages, and ground supports, a means for distributing unexpected concentrated loads developing in one span (due to several vehicles being bunched, for example) might be provided wherein linkages between the cable saddles and their associated ground supports will transmit only part of the unbalanced load caused by the vehicles to the two adjacent supports, and part of the unbalance will also be transmitted to the neighboring ground supports in either direction.

COMPENSATING FOR CHANGES IN PRE-TENSION CAUSED BY TEMPERATURE CHANGES

Seasonal and diurnal temperature variations result in expansions and contractions of the horizontal load-bearing members, which, if not compensated for, may—in certain design configurations—cause the pre-tension in the load-bearing members to exceed some desired maximum or drop below a desired minimum, with resultant fluctuations in the deflection under dynamic load. For example, in Case 1 of Table 1, a change of −40° F. to +110° F. would cause 5±0.2 inch difference in midspan sag when dynamically loaded at 1700 lbs./cable, and 4.0±0.2 inch when dynamically loaded at 1100 lbs./cable. Since the secure attachment of a single long length of load-bearing member to many ground supports along its length will ordinarily render it impractical to adjust pre-tension in the load-bearing member by turnbuckles or other take-up devices at the terminals (which devices, however, are used to impart the initial pre-tension during erection), a preferred alternative is to provide means for tension adjustment at the points of attachment to the ground support. One such arrangement is shown in FIGURE 25, where vertically adjustable U-bolts 63, impinging on rigid rounded load distributors 67 exerting a strong downward force on the horizontal load-bearing members 64 impart a slight kink in the latter (shown greatly exaggerated in the figure), the vertical dimension or depth of which can be altered slightly by tightening or loosening nuts 65. Although not shown, means for bridging the kinked segment at the tension members 64 would be provided wherein short horizontal support bars, pipes, or other rigid structure would traverse the notch between bearing points 66, so that the channel-forming members (not shown) would be attached along a horizontal line as if no kink were present.

A method for compensating for tension changes in cables that may be preferred in most installations where the number of ground supports per length of cable is relatively few would be the employment of hydraulic jacks at the terminals. These can be accurately tensioned with calibrated jacks and pressure gauges, through their use would require loosening of the cable attachments to the ground supports during tension adjustment, followed by retightening.

ROADBED SCREENS

As a means of offsetting adverse psychological effects that might be experienced by passengers traversing elevated roadways which interpose so little solid structure between the vehicle and the ground, roadbed screens giving the appearance of a solid structure under the entire vehicle may be attached to the underside of the channels so as to cover the open space between them. Such additions of structurally non-functional members are desirably kept to an absolute minimum of weight in order not to increase the overall static load by any significant degree (including the additional static load from wind or from snow retained on the structure); hence, roadbed screens might preferably be made of weather-resistant plastic grills, having the maximum open spacing which will prevent seeing the ground from the vehicle. For example, a roadbed screen made of 3-inch wide strips formed into a 6-foot wide grill having a basic rectangle of 3″ x 12″ (long direction transverse to direction of travel) would weigh only 1.2 lbs. per lineal foot of 2-channel lane.

ADAPTABILITY TO AUTOMATIC TRANSPORTATION SYSTEMS

Of four principal requirements for fully automatic transportation systems for passenger vehicles: (1) infrequent stops except at route terminals or turns; (2) directional guidance along roadway; (3) maintenance of a minimum safe vehicle spacing, including emergency stop capability; (4) automatic routing; the instant invention provides the first as an inherent characteristic of elevated roadways—that is, the ability to go over or under crossing roadways without an intersection requiring alternating stop-and-go traffic. The second requirement, directional guidance, will likewise be an inherent feature of the proposed roadway, whenever channeled grooves are used for guiding wheels down their centers. Equipment to provide the additional requirements of minimum vehicle spacing and automatic routing would, in most circumstances, be incorporated primarily on the vehicles themselves rather than on the roadway system, although certain auxiliaries added to the latter may be necessary. Hence, the elevated roadway of this invention, especially where used with wheel-guiding channels as the road "surface," may be said to have already built into it the most important prerequisites necessary in a roadway for an automatic transportation system, with relatively minor additional investment required within the roadways system itself in order to achieve all the requirements of an automatic transportation system.

Means for rapid retrieval of disabled vehicles would have to be developed for use on installations of appreciable length, based either on frequent access points—with rescue vehicles reaching the disabled vehicle from the nearest forward access point—or by use of large helicopters, as is being investigated experimentally for conventional limited access highways.

The invention is covered in the claims which follow.
What I claim is:

1. A roadway for a vehicle composed of at least one track for aligned wheels on a vehicle, the track being supported at least in part by longitudinal load-bearing members supported at intervals by ground supports between which supports the load-bearing members sag when a vehicle is thereon between the supports, the track being composed of a plurality of track-forming members placed consecutively along the load-bearing members and attached thereto, each of said track-forming members comprising a substantially horizontal transverse surface on which the wheels bear and at least one portion projecting relatively vertically therefrom which projection includes attachment means for affixing the load-bearing member, the points of attachment of the track-forming members to the load-bearing members being at different heights relative to the wheel-bearing surface of the track, said points of attachment being higher in relation to the wheel-bearing surface at the supports than at a distance away from the supports and being lowest at substantially the midpoint between the ground supports.

2. The roadway of claim 1 in which all load-bearing members are below the tops of the wheels of vehicles which the roadway is designed to carry.

3. An elevated roadway which includes a track supported by ground supports at intervals along its length, the wheel-bearing surface of which track is individually crowned upward longitudinally between each two successive supports, which crowned surface becomes substantially straight under load.

4. A roadway for vehicles weighing within a prescribed range, the roadway being supported at intervals by at least three longitudinally spaced supports and including a wheel-bearing surface individually crowned upward between each two consecutive supports to provide nodes separated by antinodes with a maximum crown at mid-span of substantially ¼ to 2 percent of the distance between said supports, which degree of crown at any point between the supports is substantially equal to the sag of said surface when a weight within said range is imposed upon it.

5. A roadway supported at intervals by at least three longitudinally spaced supports and including a wheel-supporting surface individually crowned upward longitudinally between each two consecutive supports to provide nodes separated by antinodes with a maximum crown at mid-span of substantially ¼ to 2 percent of the distance between said supports, which degree of crown at any point between the supports is substantially equal to the sag of said surface when a vehicle within a prescribed weight range is carried thereon, said wheel-supporting surface being supported in turn by load-bearing members pre-tensioned under the full static load to between 15 and 40 percent of their ultimate strength.

6. A roadway supported at intervals by ground supports and comprising load-bearing members extending between said supports to provide nodes separated by antinodes with a wheel-bearing surface attached to the load-bearing members, which wheel-bearing surface is individually crowned between each two supports and which are pre-tensioned under their full static load to between 15 and 40 percent of their ultimate strength, with at least one track composed of transverse members supported individually from said load-bearing members.

7. The roadway of claim 6 in which the transverse members are no more than ½ inch thick with a space of 1 to 5 inches between each two transverse members.

8. The roadway of claim 5 in which two tracks constitute the wheel-supporting surface and the tracks are interconnected at intervals of 2 to 25 percent of the distance between consecutive supports by rigid cross members securely fastened thereto to prevent relative vertical displacement of the individual load-bearing members and to prevent objectionable rotation of the tracks about their long axes.

9. The roadway of claim 5 in which the load-bearing members are below the tops of the wheels of a vehicle which the roadway is designed to carry.

10. The roadway of claim 6 in which each transverse member has two essentially vertical portions extending up from the wheel-bearing surface, and the transverse distance between the tops of said portions is less than any other transverse distance between the said portions at any substantial distance above the load-bearing surface, so that any wheel on the load-bearing surface will not make contact therewith below the top.

11. A roadway over a street a substantial portion of which is a substantially uniform height above the street level, which roadway comprises at least one track designed to accommodate wheels on a vehicle, more than two ground supports adjacent the opposite edges of the street spaced longitudinally of the track, with the track supported by load-bearing members supported by the ground supports, the load-bearing members being individually crowned longitudinally between each two of said longitudinally spaced supports to provide nodes separated by antinodes.

References Cited by the Examiner

UNITED STATES PATENTS

| | | | |
|---|---|---|---|
| 1,085,649 | 2/14 | Webber | 104—123 |
| 2,059,693 | 11/36 | Hamilton | 104—123 |
| 2,161,105 | 6/39 | Strauss | 104—124 |
| 2,266,549 | 12/41 | Hamilton | 14—18 |
| 2,304,648 | 12/42 | MacMillan | 104—124 |

EUGENE G. BOTZ, *Primary Examiner.*

JACOB L. NACKENOFF, LEO QUACKENBUSH,
*Examiners.*